F. A. HART.
COMBINED TYPE WRITING AND COMPUTING MACHINE.
APPLICATION FILED FEB. 11, 1911.

1,190,233.

Patented July 4, 1916
5 SHEETS—SHEET 1.

Fig. 1

WITNESSES:

INVENTOR
Frederick A. Hart
BY
ATTORNEY

F. A. HART.
COMBINED TYPE WRITING AND COMPUTING MACHINE.
APPLICATION FILED FEB. 11, 1911.

1,190,233.

Patented July 4, 1916.
5 SHEETS—SHEET 4.

UNITED STATES PATENT OFFICE.

FREDERICK A. HART, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,190,233.     Specification of Letters Patent.     Patented July 4, 1916.

Application filed February 11, 1911. Serial No. 607,925.

*To all whom it may concern:*

Be it known that I, FREDERICK A. HART, a citizen of the United States, residing in Hartford, in the county of Hartford and State of Connecticut, have invented certain new and useful Improvements in Combined Type-Writing and Computing Machines, of which the following is a specification.

This invention relates generally to that class of combined typewriting and adding machines in which computing devices are set up by the numeral keys of the typewriter, and subsequently rotation is effected of the computing wheels, each to an extent determined by the setting of the computing devices by the numeral keys. The carriage of the typewriter is connected to the computing mechanism in a manner to determine the denomination of the computing device which is set by any key. A machine of this general description is illustrated in my pending application No. 466,836, filed December 10, 1908.

One of the principal objects of the present invention is to provide simple and efficient means for causing the general computing operator to be actuated automatically, upon the writing of any figure in the units place in a column, or in other words, upon the setting up of a computing device in the units place in the computing mechanism.

In the preferred form of the invention, I employ a constantly running motor, as set forth in my pending application No. 596,451, filed December 9, 1910; and this motor, whenever any key is operated to write in the units place in a column, is caused to be connected up to the general operator of the computing machine to reciprocate the same, and thereby effect the desired setting of the computing wheels. Said operator is shown in said applications as of a reciprocating type, and a rotatable member is connected thereto by a crank, so that one rotation of said member will effect a complete reciprocation of the general operator. This rotatable member is connectible by a clutch to said constantly running motor. The clutch is normally open. A connection extends from the key-controlled mechanism of the typewriting machine to said clutch, to effect the closing of the same automatically at the desired point in the line of writing.

Preferably the clutch tends normally to close, but it is provided with a restraining device which holds it open; and in order to release said restraining device, I preferably provide a power-driven releaser, which, however, is normally disconnected from said restraining device, but at the operation of the typewriting machine at the required point, is automatically connected to said restraining device to release it and permit the clutch to close.

Upon the carriage of the typewriter, there is mounted a wiper, cam or tappet, which, as set forth in my said applications, at each step of the carriage, whenever computation is begun, operates one of a set of jacks, whereby is determined the denomination of the computing device to be set by the next depression of a typewriter key. This cam or tappet is caused also, according to the present improvements, to operate a supernumerary jack, which in turn effects connection between a constantly vibrating device and said clutch-restraining device, to release the clutch and permit it to close, so that when the carriage advances (upon the release of the type key employed to write in the units place) said supernumerary jack effects the closing of said clutch, and hence the general operator is actuated and the computing wheels rotated accordingly. Said clutch is also closable by a special key, whenever required. There may be several of said cams or tappets provided, so that cross-adding may be effected, that is, so that several columns may be written upon the work sheet, numbers being written in each column during each run of the carriage; and the result of all the numbers that are written during the run of the carriage may be shown upon the computing wheels.

The automatic means for actuating the general operator at each computation in the units place, is also, according to one feature of the present invention, applied to each of several groups of adding mechanism, such as shown in said application No. 466,836. I illustrate in the drawings three such groups, each group including a computing head or a gang of computing wheels; and the construction and operation is such, that whenever a computing device is set by a key in the units place in any of said groups, the general operator will be automatically reciprocated, and the computing wheels in that group turned accordingly; the wheels in the other groups being undisturbed. In this way, vertical adding may be done in each of two or more columns written upon the work sheet; each group of computing mechanism being provided with a supernumerary jack for closing said clutch, and each of said supernumerary jacks being operable only by the cam or tappet which controls the jacks in the same group. Provision is also made for silencing any of the supernumerary jacks, thus permitting various kinds of computation to be effected.

Other features and advantages will hereinafter appear.

In the accompanying drawings, Fig. 2 is a sectional elevation showing particularly the connections for closing the clutch between the constantly running motor and the general operator of the computing mechanism; said clutch being shown open. Fig. 2ᴬ is a sectional view to illustrate the details of the clutch mechanism; the clutch being open. Fig. 2ᴮ is a sectional plan, showing the connection between a motor-driven rotary device and a part of the reciprocating general operator of the computing machine.

Figure 3:
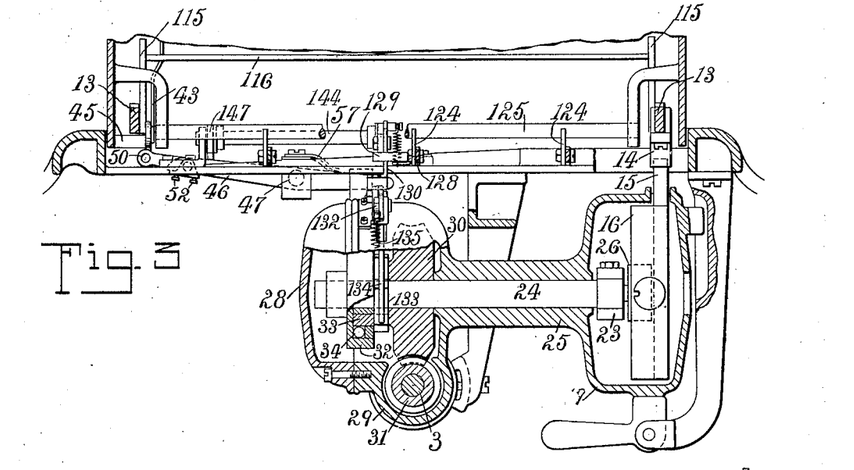
Fig. 3 is a sectional view, showing the motor mechanism and its connections. This view is taken across the base of the computing machine.

A continuously running electric or other motor 1 is provided with a main shaft 2, the latter connected to a shaft 3 by means of a safety friction clutch. This clutch may comprise a disk 5 having a hub 4 keyed to the shaft 2, a friction disk 6 being loose on said hub; another friction disk 7 being confined between disks 5 and 6. An arm 8 fast on shaft 3 is bent over at 9 to be engaged and driven by a lug 10 on disk 6. A compression spring 11 is coiled around the hub 4, and adjusted by a nut 12 to determine how much of a load the clutch will carry without slipping.

A rack 13, forming part of a rock frame, is movable forwardly and backwardly in the base of the adding machine, and performs the final portion of the computing operation. This rack frame is reciprocated intermittently by the constantly rotating shaft 3, by means of a clutch mechanism; said rack frame being connected to a crank shaft to be driven thereby, and the crank shaft being connected by a worm gearing to said shaft 3, as will presently be set forth.

Figure 1:
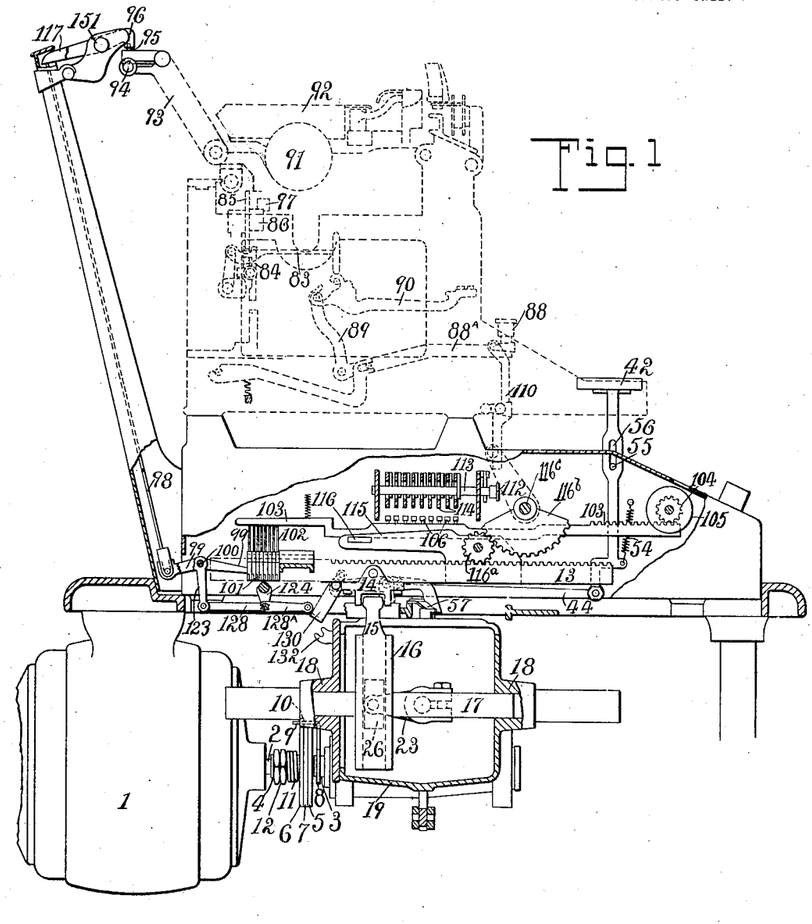
Figure 1 is a part-sectional side elevation of an Underwood typewriter combined with a computing machine of the Hanson type, and showing the present improvements applied thereto; the parts being in normal positions, and certain devices being omitted for the sake of clearness.

Upon the rack frame is secured a yoke or carrier 14, in engagement with which is the upper end of an arm 15, provided on a cross head 16, which moves forwardly and backwardly, or from left to right at Fig. 1, so as to reciprocate said rack frame 13; said cross head being carried on a horizontal slide 17, which works in bearings 18 on a casing 19. This slide is reciprocated by means of a crank 23, fixed on a horizontal shaft 24; said crank carrying a slide block 26, working in a groove 27 in the cross head. Loose on shaft 24 is a worm gear 30, meshing with a worm 31, the latter fixed on shaft 3, so that the worm wheel 30 is constantly rotating. The worm wheel 30 is connectible to shaft 24 to turn the same whenever it is necessary to reciprocate the rack frame 13 to complete a computing operation; and at the conclusion of said reciprocation, said worm wheel 30 is automatically disconnected from the shaft 24, and the latter comes to a stop, while the motor 1 continues to rotate.

Figures 2, 2A, 2B:
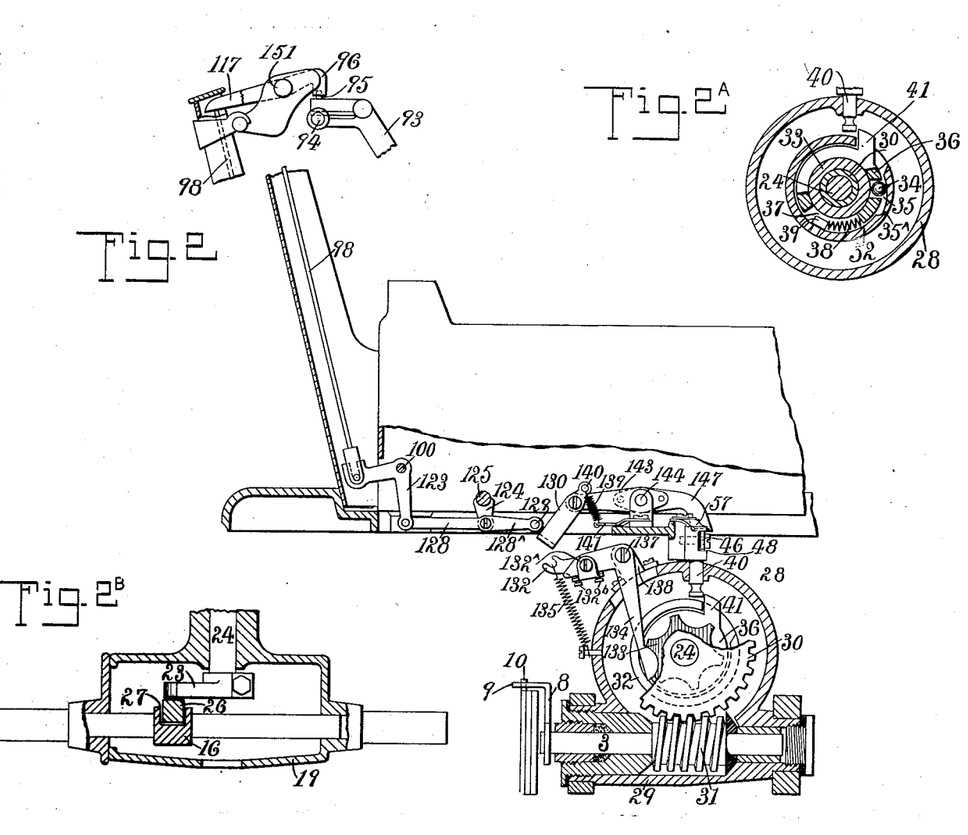

Fixed to shaft 24 is a cup member 32 of a clutch; and fixed to the hub of worm gear 30 is a collar 33. Running on this collar and adapted to engage the inside of a cylindrical face of the clutch cup 32, is a gripping ball or roll 34; said roll occupying a pocket 35 in the clutch cup, and rolling on an inclined floor 35ᵃ thereof, so that relative movement of the clutch cup and collar 33 in one direction will cause said members to be clutched together by the roll, while relative movement in the opposite direction will produce the opposite effect, so as to permit independent rotation of the gear 30.

The clutch roll is shiftable between gripping and releasing positions in the pocket 35 by means of an annular disk or ring 36, which rides loosely on the collar 33 within cup 32, and which is cut away at one place to receive the roll 34, so as to engage the roll on both sides thereof. Rotation of ring 36, therefore, shifts the roll. Against said ring 36 bears one end of a compression spring 38, which is confined within a pocket 37 formed in said ring; the other end of said spring bearing against a stop 39 secured to the inner side of the clutch cup. The pocket 37 is of sufficient length to permit a movement of the ring 36 without interference from the stop 39. The spring tends to turn the ring 36 with the roll 34 in a direction to lock together the clutch cup with the bearing collar to cause shaft 24 to rotate with gear 30. In other words, said spring tends normally to close the clutch. Normally, however, said ring 36 is restrained from causing the roll to bind; or in other words, said ring is normally held in clutch-releasing position. For this purpose, there is provided a trip pin or latch 40, normally in engagement with a lug 41 provided upon releasing ring 36, said lug projecting through an opening in the clutch cup. When shaft 24 is to be clutched to the gear 30, the latch 40 is raised to release lug 41, whereupon spring 38 throws ring 36, together with roll 34, thus locking the clutch cup and the shaft 24 to the rotating worm gear 30. The pin 40 is automatically dropped again into the path of lug 41, so that at the completion of a single rotation of the shaft 24, the latter is again unclutched from the worm gear 30.

The rack frame 13 is caused to reciprocate after the numeral keys of the typewriter have been operated to set up a number. This rack frame operates to turn the computing wheels to different extents, depending upon the key operated. It is necessary, therefore, in some cases, for the described clutch to operate after each number is written on the typewriter; and while the present improvement relates particularly to means for securing such operation automatically, or without attention on the part of the operator, still I will first describe means whereby the operator may depress a special key to operate said clutch, and cause the reciprocation of the rack frame; this mechanism being substantially shown in my said application No. 596,451. Said key is designated as 42, and is mounted on a stem 43, pivoted at its lower end to a lever 44, fulcrumed at 45 upon the machine frame. Said lever 44, in turn, depresses a cross lever 46, which is pivoted at 47 to the framework, and at its other end engages a notch 48 formed in the top of the trip pin or latch 40, so as to cause or control the up and down movement of said latch, whereby the clutch is caused to close and open. The lever 46 is provided with an adjustable end or arm 50, upon which the key lever 44 bears; this part 50 being adjustable by screws 52, thereby securing accuracy of adjustment and movement of the clutch-controlling mechanism.

Depression of the key 42 carries down the lever 44, the latter rocks the lever 46 about its fulcrum 47, the other end of the lever 46 lifting the latch 40 away from the clutch lug 41. The operator immediately releases the key 42, which is returned to normal position by a spring 54. The movement of the key is limited by a pin 55 within a slot 56 in the key stem. The lever 46 has a returning spring 57.

The typewriter includes the usual set of type-operating keys, including alphabet keys and also including numeral keys 88 mounted on levers 88ª and connected by bell cranks 89 to type bars 90, which are thrown back against a platen 91 mounted on a carriage 92. The carriage is power-driven, as usual, and has a rack 97 meshing with a pinion 86, connected with an escapement wheel 85, the latter controlled by dogs 84, operated by a universal bar 83, which is actuated by the type bars, so that whenever any type key is actuated, the carriage 92 is caused to feed a letter space.

Fastened at the back of the carriage 92, are brackets 93, carrying a rack 94, to receive adjustable cams or tappets 95. Whenever any tappet, during the travel of the carriage, passes beneath the set of jacks 96, it raises the forward ends of the jacks in succession, turning each on its pivot 97, and depressing its rear end to press down the corresponding one of a set of wires 98. These wires are connected at their lower ends to levers 99 on a fulcrum rod 100. Each lever 99 raises one of a set of linkages 101, each linkage having a pin 102 to lift the rear end of a rack 103, the forward end of which meshes with a pinion 104 connected to a computing wheel 105. Each rack carries a set of index pins 106, and one of these is depressed to set up or index said number by the operated type key 88; each key having a stem 110, for this purpose, to depress a crank 112, fast to a shaft 113, which is connected to a linkage 114, to depress one of the pins 106 upon the lifted rack bar 103; there being one linkage 114 for each key, each linkage being in position to depress a corresponding pin 106 on whichever rack is lifted, as set forth in my pending applications.

After the keys 88 are manipulated to write a number, and the corresponding racks 103 accordingly elevated as the paper-carriage feeds along, and certain pins 106 thereon depressed, there must be caused a reciprocation of the rack frame 13. This frame usually includes a pair of arms 115 connected by a transverse horizontal bar 116, which is in position to engage all the displaced pins 106, and to give corresponding forward endwise movements to their racks 103, thereby turning the computing wheels 105 accordingly; the return movements of the racks not turning said wheels, however, because of a pawl-and-ratchet connection (not shown) between said wheels and their drive pinions 104. Pinions 116ª meshing with racks 13, are also in mesh with segments 116ᵇ fixed on rock-shaft 116ᶜ. This computation movement of the rack frame or so-called "operator" 13 is secured automatically, at the completion of the writing of a number, that is, without the necessity of depressing the key 42, and without the necessity of the operator keeping the matter in mind. For this purpose, at the left-hand end of each group of jacks 96 is placed a supernumerary jack 117, connected by a wire 98 to a bell crank 123, pivoted on shaft 100 at the left-hand end of the gang of levers 99. The bell cranks 123 are connected by links 128 to arms 124, depending from a horizontal transverse rock shaft 125. The middle link 128 has a forward extension 128ᴬ, carrying a pin 129, which at the movement of any of the bell cranks 123, is thrust forwardly against a link 130, the latter pivoted near its upper end on an arm 143, for the purpose of vibrating the latter. This link 130 is normally idle, but is capable of swinging to position to form an interponent or movement-transmitter between said arm 143 and an arm 132, which latter is power-driven and constantly vibrates up and down, so that said arm 143 is vibrated, together with rock shaft 144 on which it is fixed, and an arm 147 on said shaft 144 swings down to operate the lever 46, which it will be remembered, lifts the clutch latch 40 so that the shaft 24 becomes clutched to the gear 30, and hence the rack frame or operator 13 is caused to reciprocate.

The arm 132 is kept in constant vibration by means of a follower 134, the lower end whereof is pressed by a spring 135 against a wheel 133, which is in the nature of a star wheel or cam wheel, consisting of a succession of depressions and elevations. This wheel 133 is fixed to the worm gear 30, and hence the arm 132 is constantly vibrated up and down while the motor 1 is in operation. The arm 132 is adjustably connected to the follower 134 by means of a pivot 132ᴬ and adjusting screws 132ᵇ, as seen at Fig. 4.

Figure 4:
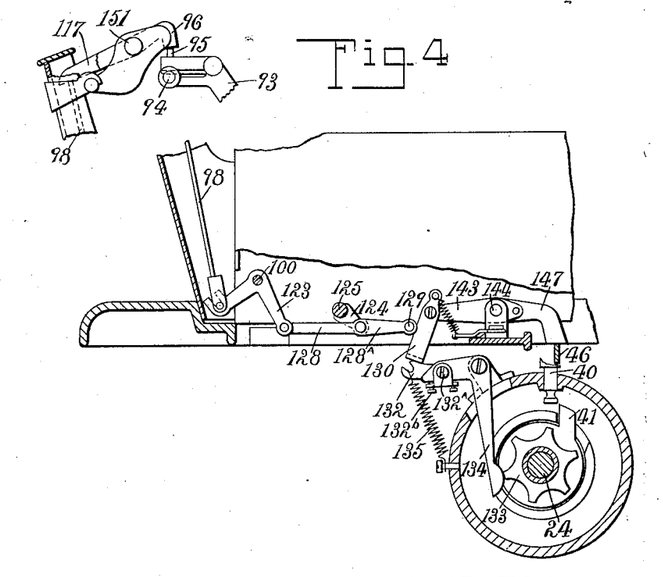
Fig. 4 is a view similar to Fig. 2, but showing the method of closing the clutch.
Figure 5:
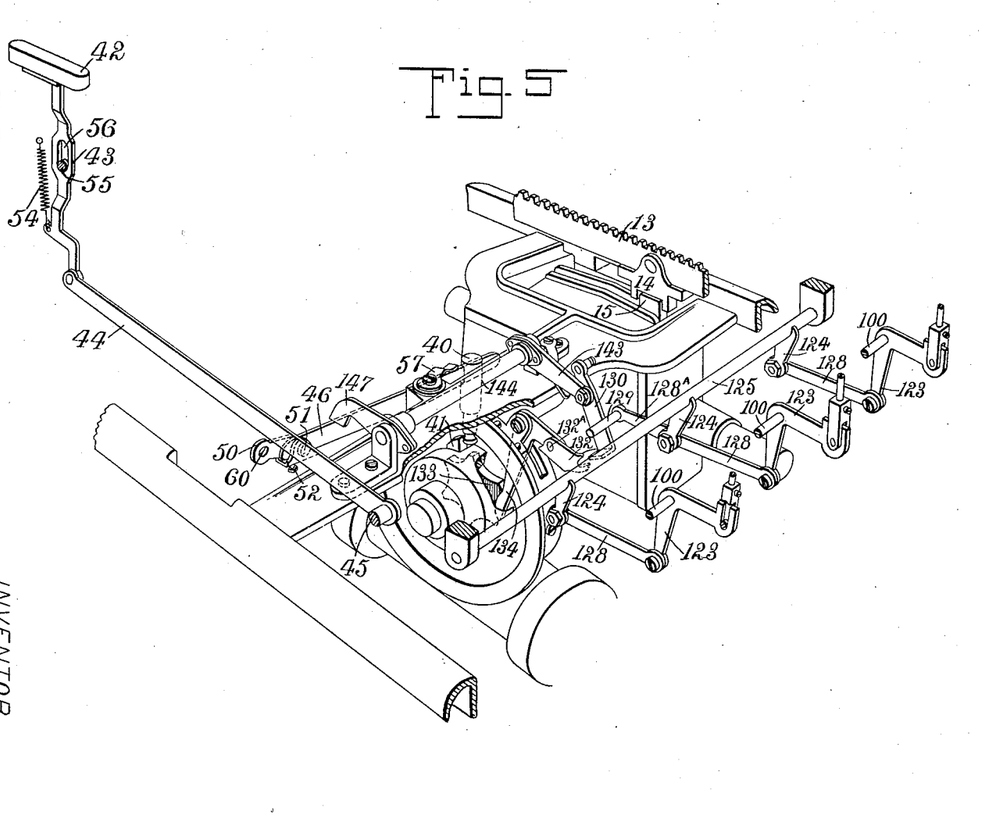
Fig. 5 is a perspective rear view of the lower part of the computing mechanism, showing particularly the means for automatically closing the clutch between the motor and the general operator of the machine.

It will be understood that when the pin 129 thrusts forward the interponent 130, the latter is swung to position over the arm 132, as seen at Fig. 4, and the latter, when rising, thrusts up the interponent 130, and swings arms 143 and 147, and trips the clutch, as already explained; so that the computing operation is completed automatically as the paper carriage 92 of the typewriter completes the letter spacing operation which is occasioned by the return to normal position of the type-operating numeral key 88 which was employed to write in the units place.

Figure 6:
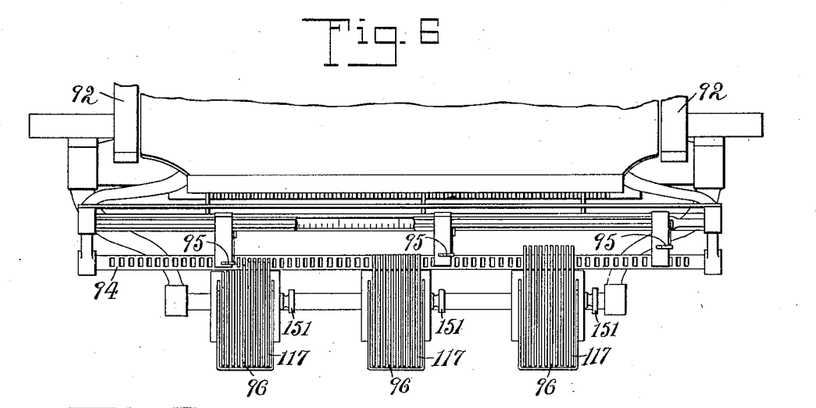
Fig. 6 is a plan view of the rear portion of the typewriter carriage, and also showing three groups of jacks forming portions of the three groups of computing mechanism.
Figure 7:
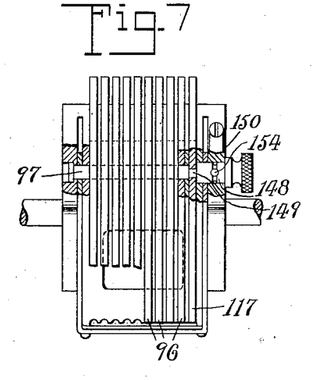
Fig. 7 is a plan of a set of jacks, showing particularly the means for silencing the supernumerary jack when required.
Figure 8:
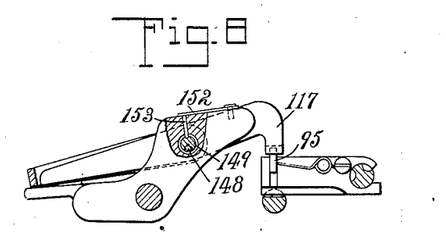
Fig. 8 is a sectional elevation of a supernumerary jack, showing it in normal position.
Figure 9:
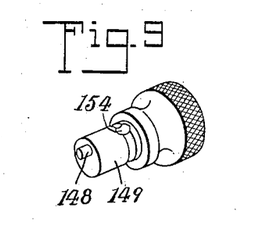
Fig. 9 is a perspective view of a button having an eccentric on which a supernumerary jack is pivoted, and whereby the latter may be swung up to silence it when required.
Figure 10:
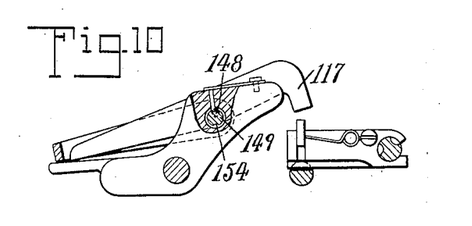
Fig. 10 is a view similar to Fig. 8, but showing the supernumerary jack as silenced.

At Fig. 6 are shown in plan three groups of jacks 96 and three tappets 95, one for each of said groups, as set forth in my said application No. 466,836; these tappets being independently adjustable along the rack bar 94 on said paper carriage 92. It will be understood from this that the general operator 13 will be actuated each time that a key 88 is operated to calculate a number in the units place, in any of the three groups of computing mechanism; said general operator 13 being therefore actuated three times during each line of writing, assuming that three columns are being written at the same time upon the work sheet.

Provision is made for silencing any one or more of the jacks 117 at Fig. 6, as will be understood by reference to Figs. 7 to 10. Each jack is pivoted upon a pin 148, which is formed eccentrically upon a stub-shaft 149, which is journaled in the jack frame 150 in line at Fig. 7 with the pivot 97 of the denomination jacks 96. Upon each stub-shaft is provided a button 151, whereby the pivot 148 may be rotated from its normal depressed position at Fig. 8 to its elevated position at Fig. 10, the jacks 117 in the former case being held down in working position, and in the latter case being held up clear of the tappets 95, so that the actuation of the general operator 13 will not occur. The buttons are independently movable, so that the operator may have such jacks 117 in or out of use as he may desire. Each stub-shaft 149 may be held in either of its Figs. 8 and 10 positions by means of a spring 152 and detent pin 153, the latter engaging a depression 154 in the stub-shaft.

Variations may be resorted to within the scope of the inventions, and portions of the improvements may be used without others.

Having thus described my invention, I claim:

1. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of means connected to a source of power for actuating said operator, said source of power wholly independent of said carriage, and means operated by the typewriter carriage in its motion for causing said actuating means to operate.

2. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of means connected to a source of power for actuating said operator, said source of power wholly independent of said carriage, and means operated by the typewriter carriage only when advancing from the units place, for causing said actuating means to operate.

3. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a constantly rotating motor, and means dependent upon the letter-feeding movement of the typewriter carriage for connecting said motor to said operator to actuate the latter.

4. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a constantly rotating motor, a normally broken train of mechanism extending from said motor to said operator to actuate the latter, and means dependent upon a movement of the typewriter carriage for restoring said train to effective condition.

5. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a motor, and means connected to the typewriting mechanism for enabling said motor to actuate said operator after the writing of a number in the units place.

6. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a rotary actuator connected to said operator for reciprocating the same, a constantly rotating motor, a normally open clutch between said rotary actuator and said motor, and means for closing said clutch automatically upon the advance of said carriage.

7. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a rotary actuator connected to said operator for driving the same, a motor, a normally inactive connection between said rotary actuator and said motor, a projection or cam upon said carriages, and a controller movable by said projection or cam to render said connection inactive.

8. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of a motor, a rotary device connected to said operator for driving the same, a normally inactive connection between said rotary device and said motor, said connection tending constantly to become active, a device to restrain said connection from becoming active, and means dependent upon a movement of the typewriter carriage for releasing said connection from the control of said restraining device.

9. The combination of a typewriter carriage, carriage-feeding numeral keys, computing devices set by said keys, a general operator for said computing devices, a motor, and means dependent upon the feeding of said carriage from units position for enabling said motor to actuate said operator.

10. The combination of a typewriter carriage, carriage-feeding numeral keys, computing devices of different denominations settable by said keys, a general operator for said computing devices, a set of jacks, a cam or device on said carriage to move said jacks successively for determining the denomination of the computing device to be set by said keys, a supernumerary jack also operable by said cam at the next movement thereof after the units jack is operated, and means controlled by said supernumerary jack for actuating said operator.

11. The combination of a typewriter carriage, carriage-feeding numeral keys, computing devices of different denominations settable by said keys, a general operator for said computing devices, an independently driven motor for actuating said general operator but normally disconnected therefrom, a set of jacks, a cam or device on said carriage to move said jacks successively for determining the denomination of the computing device to be set by said keys, a supernumerary jack also operable by said cam at the next movement thereof after the units jack is operated, and means controlled by said supernumerary jack for connecting said motor to said operator.

12. The combination of a typewriter carriage, carriage-feeding numeral keys, computing devices of different denominations settable by said keys, a general operator for said computing devices, an independently driven motor, a normally inactive connection between said motor and said operator, said connection normally tending to become active, a restraining device for holding said connection inactive, a set of jacks, a cam or device on said carriage to move said jacks successively for determining the denomination of the computing device to be set by said keys, a supernumerary jack also operable by said cam at the next movement thereof, after the units jack is operated, and means controlled by said supernumerary jack for releasing said connection from the control of said restraining device.

13. In a computing machine comprising keys, computing devices settable by said keys, and a general operator, the combination of a primary motor normally disconnected from said general operator, a device connected to said motor to be constantly reciprocated idly thereby, and key-controlled means to enable said idle device to connect said motor to said operator.

14. In a computing machine comprising keys, computing devices settable by said keys, and a general operator, the combination of a primary motor normally disconnected from said general operator, a device connected to said motor to be constantly reciprocated idly thereby, means to enable said idle device to connect said motor to said operator, said connecting means including an interponent normally out of effective position, and key-controlled means for moving said interponent into effective position.

15. In a computing machine comprising keys, computing devices settable by said keys, and a general operator, the combination of a rotatable device for actuating said general operator, a motor, a normally inactive connection between said motor and said rotatable device, a device connected to said motor to be vibrated thereby, and key-controlled means to enable said vibrating device to render said connection active.

16. In a computing machine, comprising keys, computing devices settable by said keys, and a general operator, the combination of a rotatable device for actuating said general operator, a primary motor having a worm, a gear in mesh with said worm, a connection between said gear and said rotatable device, a cam connected to said worm gear to rotate therewith, a vibrator operated by said cam, and means to enable said vibrator to close said clutch.

17. In a computing machine comprising keys, computing devices settable by said keys, and a general operator, the combination of a rotatable device for actuating said general operator, a primary motor having a worm, a gear in mesh with said worm, a connection between said gear and said rotatable device, a cam connected to said worm gear to rotate therewith, a vibrator operated by said cam, and means dependent upon the operation of a part of the computing machine, for enabling said vibrator to render said connection active.

18. In a computing machine comprising keys, computing devices settable by said keys, and a general operator, the combination of a rotatable device for actuating said general operator, a primary motor, a normally inactive connection between said motor and said rotatable device, means normally tending to render said connection active, a restraining device for holding said connection inactive, a cam connected to said motor to rotate therewith, a vibrator operated by said cam, and an interponent between said vibrator and said restraining device, said interponent normally in effective position, but movable by a key into position to enable said vibrator to release said connection from said restraining device.

19. In a computing machine comprising keys, computing devices settable by said keys, and a general operator, the combination of a rotatable device for actuating said general operator, a primary motor, a normally inactive connection between said motor and said rotatable device, means normally tending to render said connection active, a restraining device for holding said connection active, a cam connected to said motor to rotate therewith, a vibrator operated by said cam, a lever to release said connection from said restraining device, and a key-controlled interponent between said vibrator and said lever, said interponent normally in ineffective position, but movable by a key into position to connect said lever to said vibrator.

20. In a typewriting and computing machine, the combination of a typewriter carriage, type-operating numeral keys having means for feeding said carriage, a plurality of computing heads, each having devices settable by said keys in coöperation with said carriage, whereby computation may be effected in a plurality of columns, a common operator for said computing heads, means connected to a source of power for actuating said common operator, and automatic means dependent upon a movement of the typewriter carriage upon computation in either column, for causing said actuating means to operate.

21. In a typewriting and computing machine, the combination of a typewriter carriage, type-operating numeral keys having means for feeding said carriage, a plurality of groups of computing mechanism, each including devices settable by said keys in coöperation with said carriage, whereby computation may be effected in a plurality of columns, normally ineffective means connected to a source of power for operating the computing devices set by the keys, and means dependent upon a movement of the carriage relatively to the units place in each column, for causing said operating means to become effective.

22. In a typewriting and computing machine, the combination of a typewriter carriage, type-operating numeral keys having means for feeding said carriage, a plurality of groups of computing mechanism, each including devices settable by said keys in coöperation with said carriage, whereby computation may be effected in a plurality of columns, normally ineffective means connected to a source of power for operating the computing devices set by the keys, a series of independently operable jacks or devices, means connected to said jacks for causing said operating means to become effective, and means to enable said carriage to operate said jacks successively during the writing of a single line.

23. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, an operator common to said groups of computing mechanism, a constantly rotating motor, and means dependent upon a movement of the typewriter carriage relatively to the units place in each column, for connecting said motor to said operator to actuate the latter.

24. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, an operator common to said groups of computing mechanism, a primary motor, a normally broken train of mechanism extending from said motor to said operator to actuate the latter, a series of jacks or devices movable in succession by said carriage in connection with the writing of numbers in the units places in said columns, and connections from said jacks to said train to restore the latter to effective condition.

25. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, a primary motor, a rotatable device, means for enabling said rotatable device to operate the computing devices set by the keys, a normally inactive connection between said motor and said rotatable device, a series of jacks or devices movable in succession by said carriage in connection with the writing of numbers in the units places of said columns, levers to which said jacks are loosely connected, a power-driven vibrator, connections from said vibrator to said inactive connection to render the same active, said connections including a normally displaced interponent, and means for enabling any of said levers to move said interponent to effective position.

26. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, a motor, a rotatable device, means for enabling said rotatable device to operate the computing devices set by the keys, a normally inactive connection between said motor and said rotatable device, a series of jacks or devices movable in succession by said carriage in connection with the writing of numbers in the units places of said columns, a series of bell cranks, links connecting said jacks loosely to said bell cranks, a rock shaft having arms to which said bell cranks are connected, an interponent controlled through said rock shaft, a power-driven vibrator, a lever to which said interponent is connected, said interponent movable by said rock shaft into position to connect said vibrator to said lever, and means to enable said lever to control the activity of said connection.

27. The combination with numeral keys, of a series of groups of computing mechanism each group including computing devices settable by said keys in the order of their denominations beginning with the highest, operating means for said groups, a source of power, and automatic means for enabling any of said keys upon computing in the units place in any of said groups, to cause said operating means to be actuated by said source of power.

28. The combination with type-operating numeral keys and a typewriter carriage controlled thereby, of a series of groups of computing mechanism whereby computation may be effected of the numbers in a plurality of columns written on the work sheet, each group including computing devices settable by said keys in the order of their denominations beginning with the highest, operating means for said groups, a source of power having normally ineffective means for actuating said operating means, and automatic means dependent upon the writing of a number in the units place in any of said groups of computing mechanism, for causing said operating means to be actuated by said source of power.

29. In a typewriting and computing machine, the combination with type-operating numeral keys, a plurality of groups of computing devices settable by said keys, and operating means for said computing devices, of a normally idle source of power capable of actuating said operating means, and means for enabling any of said keys at a series of predetermined points in the writing of each line corresponding to said groups of computing devices to cause said operating means to be actuated by said source of power.

30. A combined typewriting and computing machine comprising a plurality of groups of computing devices, a source of power for effecting a certain operation of said computing devices, a typewriter carriage, said source of power independent of said carriage, numeral keys having means to control the movement of said carriage, and means to enable any of said keys to coöperate with said carriage to control the operation of the computing devices by said source of power at a predetermined succession of points in each line of writing corresponding to said groups of computing devices.

31. The combination with type-operating numeral keys, a carriage, and a plurality of groups of computing devices under the control of said keys, of means connected to a source of power and normally tending to cause said computing devices to be operated by said source of power, a latch restraining said means, and means to enable any of said keys to trip said latch at a predetermined succession of points in each line of writing, corresponding to said groups of computing devices; said source of power independent of said carriage.

32. A combined typewriting and computing machine comprising a plurality of groups of computing devices, a source of power for effecting a certain operation of said computing devices, a typewriter carriage, said source of power independent of said carriage, type-operating numeral keys having means to control the movements of said carriage, means normally tending to cause said computing devices to be operated by said source of power, a latch restraining said operating means, and means to enable said carriage and said keys to coöperate to trip said latch at a predetermined succession of points in each line of writing corresponding to said groups of computing devices.

33. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices, of means connected to a source of power for actuating said operator, said source of power independent of said carriage, means including a jack operable by the typewriter carriage for causing said actuating means to operate, and means to silence said jack.

34. The combination of a typewriter carriage, carriage-feeding numeral keys, computing devices of different denominations settable by said keys, a general operator for said computing devices, a set of jacks, a cam or device on said carriage to move said jacks successively for determining the denomination of the computing device to be set by said keys, a supernumerary jack also operable by said cam at the next movement thereof after the units jack is operated, means controlled by said supernumerary jack for actuating said operator, and means for silencing said supernumerary jack at will.

35. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, a primary motor, a rotatable device, means for enabling said rotatable device to operate the computing devices set by the keys, a normally inactive connection between said motor and said rotatable device, a series of jacks or devices movable in succession by said carriage in connection with the writing of numbers in the units places of said columns, levers to which said jacks are loosely connected, a power-driven vibrator, connections from said vibrator to said inactive connection to render the same active, said connections including a normally displaced interponent, means for enabling any of said levers to move said interponent to effective position, and means for silencing said jacks as to certain of said computing heads.

36. In a typewriting and computing machine, the combination of a typewriter carriage, type-operating numeral keys having means for feeding said carriage, a plurality of groups of computing mechanism, each including devices settable by said keys in coöperation with said carriage, whereby computation may be effected in a plurality of columns, normally ineffective means connected to a source of power for operating the computing devices set by the keys, a series of independently operable jacks or devices, means connected to said jacks for causing said operating means to become effective, means to enable said carriage to operate said jacks successively during the writing of a single line, and means for silencing any of said jacks at will.

37. In a typewriting and computing machine, the combination of a typewriter carriage, type-operating numeral keys having means for feeding said carriage, a plurality of groups of computing mechanism, each including devices settable by said keys in coöperation with said carriage, whereby computation may be effected in a plurality of columns, an operator common to said groups of computing mechanism, a primary motor, a normally broken train of mechanism extending from said motor to said operator to actuate the latter, a series of jacks or devices movable in succession by said carriage in connection with the writing of numbers in the units places in said columns, and connections from said jacks to said train to restore the latter to effective condition, each of said jacks in the form of a lever, having an eccentrically adjustable pivotal mounting, whereby the jack may be displaced and thereby silenced.

38. In a typewriting and computing machine, the combination of a typewriter carriage, type-operating numeral keys having means for feeding said carriage, a plurality of groups of computing mechanism each including devices settable by said keys in coöperation with said carriage, whereby computation may be effected in a plurality of columns, a primary motor, a rotatable device, means for enabling said rotatable device to operate the computing devices set by the keys, a normally open clutch between said motor and said rotatable device, a series of jacks or devices movable in succession by said carriage in connection with the writing of numbers in the units places of said columns, means for enabling each of said jacks to effect the closing of said clutch, and means for silencing certain of said jacks.

39. The combination with numeral keys, of a series of groups of computing mechanism, each group including computing devices settable by said keys in the order of their denominations beginning with the highest, operating means for said groups, a source of power, automatic means for enabling any of said keys upon computing in the units place in any of said groups, to cause said operating means to be actuated by said source of power, and means for silencing said automatic means as to certain of said groups.

40. In a computing machine, the combination of a rotary motor driven from a source of power wholly independent of the machine, a set of numeral keys, computing devices, means set *seriatim* by said keys for determining the extent of operation of the computing devices, a general operator for moving all the computing devices concomitantly, and means called into action through the operation of any of said numeral keys for connecting said motor to said operator, to actuate the latter.

41. In a computing machine, the combination of numeral keys, computing devices, means set *seriatim* by said keys for determining the extent of operation of the computing devices, an operator for moving the computing devices concomitantly, a motor driven from a source of power wholly independent of the machine, and means under the control of any of said keys for connecting said motor to said operator to actuate the latter.

42. In a typewriting and computing machine, the combination of a typewriter carriage, type-operating numeral keys having means for feeding said carriage, a plurality of computing heads, each having devices settable by said keys in coöperation with said carriage, whereby computation may be effected in a plurality of columns, a common operator for said computing heads, means connected to a source of power for actuating said common operator, and automatic means dependent upon a movement of the typewriter carriage upon computation in the final column, for causing said actuating means to operate.

43. The combination, with a typewriting mechanism; of computing mechanism operating in several columns in each line of writing; a general operator for said computing mechanism; and means for causing the general operator to actuate the computing mechanism when the latter is operating in each column, or only in the last column.

44. The combination of numeral keys, computing devices, means set by said keys for determining the extent of operation of the computing devices, an operator for moving the computing devices, a primary motor, and means controllable by any of said keys for enabling said motor to actuate said operator upon completion of the actuation of the key that sets the operation-determining means for the units digit.

45. The combination of numeral keys, computing mechanism connected thereto, a primary motor, a normally inactive connection between said motor and said computing mechanism, a device connected to said motor to be repeatedly vibrated thereby, and means controllable by any of said keys to enable said vibrating device to render said connection active.

46. The combination of numeral keys, computing mechanism connected thereto, a primary motor, a normally inactive connection between said motor and said computing mechanism, a device connected to said motor to be repeatedly vibrated thereby, and means controllable by any of said keys to enable said vibrating device to render said connection active; said last named means including an interponent between said vibrating device and said connection; said interponent normally out of effective position.

47. The combination of numeral keys, a carriage, a plurality of computing heads, each having devices settable by said keys in coöperation with said carriage whereby computation may be effected in a plurality of columns, a common operator for said computing heads, a primary motor to drive said operator, and means controllable by said keys for causing said motor to drive said operator.

48. The combination of numeral keys, a carriage, a plurality of computing heads, each having devices settable by said keys in coöperation with said carriage whereby computation may be effected in a plurality of columns, a common operator for said computing heads, a primary motor to drive said operator, means controllable by said keys for causing said motor to drive said operator, and means for automatically disconnecting the motor from the operator.

49. The combination with a computing mechanism including a plurality of computing heads each adapted to compute in a given zone and means for running up numbers on said computing heads, of a traveling carriage controlling the zones, and automatic means for enabling the running up of numbers on said computing heads at the end of each of said computing zones.

50. The combination with a typewriting mechanism, of a computing mechanism having a series of computing heads with actuating means for running up numbers on said heads, said typewriting mechanism and said computing mechanism coöperating to form a series of computing zones corresponding to said heads, and automatic means to enable the running up of numbers on individuals of said heads between each computing zone and the next adjacent computing zone.

51. The combination with a typewriting mechanism, of a computing mechanism including a series of computing heads with means for running up numbers on said computing heads, said typewriting mechanism and said computing heads coöperating to form a series of computing zones corresponding to the several heads, and automatic means for enabling a complete cycle of operations of said computing mechanism at one extremity of each computing zone.

52. The combination with a typewriting mechanism including a traveling carriage, of a computing mechanism, a motor for driving said computing mechanism but normally disconnected therefrom, controlling means for enabling said carriage to govern the drive of said computing mechanism by said motor, and shifting means for throwing the actual burden of connecting up said motor with said computing mechanism, on said motor.

53. The combination with a typewriting mechanism, of a computing head, means distinct from said computing head to index all of the digits of a number to be computed, a motor, a normally-broken train of connections between said motor and said computing head, and typewriting-mechanism-controlled means for automatically completing the train of connections to enable the drive of said computing head by said motor an extent determined by said indexing means.

54. The combination with a typewriting mechanism arranged to write lines of typewriting, of a computing mechanism arranged to index a series of digits of a number to be computed, automatic means for repeatedly operating said computing mechanism to run up indexed numbers several times during the writing of a line, and silencing means for throwing certain of said automatic means out of operation.

55. The combination with a typewriting mechanism arranged to write lines of typewriting, of a computing mechanism arranged to index a series of digits of a number to be computed, automatic means for repeatedly operating said computing mechanism to run up indexed numbers several times during the writing of a line, and means for selectively determining which of said automatic means shall be in action.

56. The combination with a typewriting mechanism including a traveling carriage, of a computing mechanism, controlling mechanism under the control of said carriage in letter-feeding direction for governing the action of said computing mechanism, and driving means for said computing mechanism, means actuated by said driving mechanism for relieving said carriage of the actual burden of the work of its controlling action.

57. The combination with a computing mechanism, of a source of power for driving said computing mechanism, a normally interrupted train of connections between said computing mechanism and said source of power, shifting means for determining the completion of said connections to enable the drive of said computing mechanism by said source of power, an interponent, and controlling means for setting said interponent to enable the actuation of said shifting means by said source of power.

58. The combination with a typewriting mechanism, of a computing mechanism, a source of power for driving said computing mechanism, a normally interrupted train of connections between said source of power and said computing mechanism, an interponent, and means for setting said interponent from said typewriting mechanism to cause the completion of said train of connections between said source of power and said computing mechanism.

59. The combination with a typewriting mechanism including a carriage, of a computing mechanism, a source of power for driving said computing mechanism, a normally interrupted train of connections between said source of power and said computing mechanism, a shifter for completing said train of connections, an interponent, means for actuating said interponent from said source of power to enable the completion of said train of connections so that said source of power may drive said computing mechanism, and controlling means actuated from said carriage for setting said interponent to be actuated from said source of power.

60. The combination with a traveling element, of a computing mechanism, said traveling element moving step by step to coöperate with said computing mechanism in a computing zone, a motor for driving said computing mechanism, a normally broken train of gearing between said motor and said computing mechanism, and automatic means for completing the connection between said motor and said computing mechanism at the completion of a computing zone so that said computing mechanism can be actuated by said motor after said traveling element has moved far enough to pass through the computing zone.

61. In a computing machine, the combination, with a letter-feeding carriage; of computing mechanism including devices in which numbers are set up digit by digit, and devices into which said numbers are subsequently carried; a source of power; and a connection controlled by the letter-feeding of the carriage for enabling said source of power to operate the first-named devices to simultaneously carry all of the digits of the number so set up into the second-named devices.

62. In a typewriting and computing machine, the combination with a typewriter carriage, type-operating numeral keys, a letter-feeding mechanism for said carriage operable by said keys, computing devices associated with said carriage, means associated with said computing devices and set by said keys for determining the extent of operation of the computing devices, and an operator for simultaneously moving all of the computing devices affected by the means set to the extents determined by said means, of an independently driven rotatable motor, and means dependent upon the movement of the typewriter carriage in its letter-feeding direction for connecting said motor to said operator to actuate the latter.

63. In a typewriting and computing machine, the combination with a typewriter carriage, type-operating numeral keys, a letter-feeding mechanism for said carriage operable by said keys, computing devices associated with said carriage, means set by said keys for determining the extent of operation of the computing devices, and an operator for moving the computing devices to an extent determined by the means set, of a rotatable motor, a normally broken train of mechanism extending from said motor to said operator to actuate the latter, and means depending upon the movement of the typewriter carriage in its letter-feeding direction for restoring said train to effective condition.

64. In a combined typewriting and computing machine, the combination with a traveling carriage, of a tappet on said carriage, jacks operable by said tappet, a constantly rotating motor, an interponent operable by said jacks but normally held in ineffective position, computing devices, and means operated by said interponent for causing said motor to operate said computing devices.

65. In a combined typewriting and computing machine, the combination with a traveling carriage and a tappet on said carriage, of a constantly driven motor, a cam wheel on said motor, a follower vibrated by said cam wheel, an interponent adapted to be operated by said follower, computing devices connected to said motor when said follower is so operated, and a connection from said tappet for making said interponent effective.

66. In a combined typewriting and computing machine, the combination with a primary motor and a traveling carriage, of computing devices, a normally inactive connection between said computing devices and said motor, an interponent, a tappet on said carriage, a plurality of jacks operable by said tappet for putting said interponent into effective position for operation by said motor, and a cross lever operable by said interponent for causing said connection to become active.

67. In a combined typewriting and computing machine, the combination with a traveling carriage and computing devices, of a general operator for said computing devices, a rotatable motor, a slide operated by said motor for driving said operator, and a cam on the carriage for controlling the connection between said motor and said slide.

68. In a combined typewriting and computing machine the combination with a traveling carriage and computing devices, of a general operator for driving said computing devices, a motor, a worm operable by said motor for driving said general operator, and a cam on said carriage for controlling the connection between said motor and said worm.

69. In a combined typewriting and computing machine, the combination with a traveling carriage and computing devices, of a worm for driving said computing devices, a revolving motor for driving said worm, a constantly vibrating follower driven by said motor to control the connection between said motor and said worm, and an interponent movable by said carriage to enable said follower to control the connection between the motor and worm.

70. In a computing machine, the combination with a traveling carriage and a series of computing heads for computing the numbers written in a manner determined by said carriage, of a motor for driving said heads to thus compute, a normally broken connection between said motor and said heads, and a single rock shaft for automatically controlling said connection in a plurality of places as determined by said carriage.

71. In a combined typewriting and computing machine, the combination with a traveling carriage and a plurality of computing heads, each computing head having a computing device forming a part thereof, of tappets settable on said carriage for automatically determining which heads shall be operated at any time, a motor for driving said computing devices, a jack for each computing device automatically operable by said tappets, and a single rock shaft forming the connection for all of said tappets to control the operation of said motor.

72. In a typewriting and computing machine, the combination with numeral keys and a letter-feeding carriage; of devices in which numbers are temporarily set up by said keys; computing devices into which the numbers so set up are carried; a motor for so carrying them; a denomination-selecting means on said carriage; a series of jacks adapted to be operated by said selecting means; and a rock shaft operated by said jacks and adapted to connect said motor to carry the set-up numbers into the computing devices, each jack having a lost motion connection with said rock shaft.

73. In a typewriting and computing machine, the combination with a typewriter carriage; of type-operating numeral keys; a letter feeding mechanism for said carriage operable by said keys; computing devices associated with said carriage; means set up by said keys for determining the extent of operation of the computing devices; an operator for moving the computing devices; a power shaft for said operator; and automatic means dependent upon a movement of the typewriter carriage with relation to the units place or position for enabling said power shaft to operate.

74. In a combined typewriting and computing machine, the combination with typewriting mechanism; of computing mechanism; a power shaft for actuating said computing mechanism; and means for automatically causing said power shaft to actuate said computing mechanism at the end of a number by operatively connecting said power shaft to said computing mechanism, said means including a clutch normally disconnecting said power shaft from said computing mechanism and controlled by the striking of the last figure in said number by said typewriting mechanism.

75. In a combined typewriting and computing machine, the combination with numeral keys and computing wheels; of members in which numbers are temporarily registered as written, a general operator for carrying numbers so registered into the computing wheels, a denominational selector for selecting *seriatim* said registering members, a motor for driving said general operator, and a jack moved by said selector to control the starting of said general operator, and a pin to arrest said operator by disconnecting it from said motor.

FREDERICK A. HART.

Witnesses:
K. FRANKFORT,
C. RIPLEY.